March 25, 1958 W. R. AYRES ET AL 2,828,416
PULSE AMPLIFIER
Filed Oct. 22, 1953
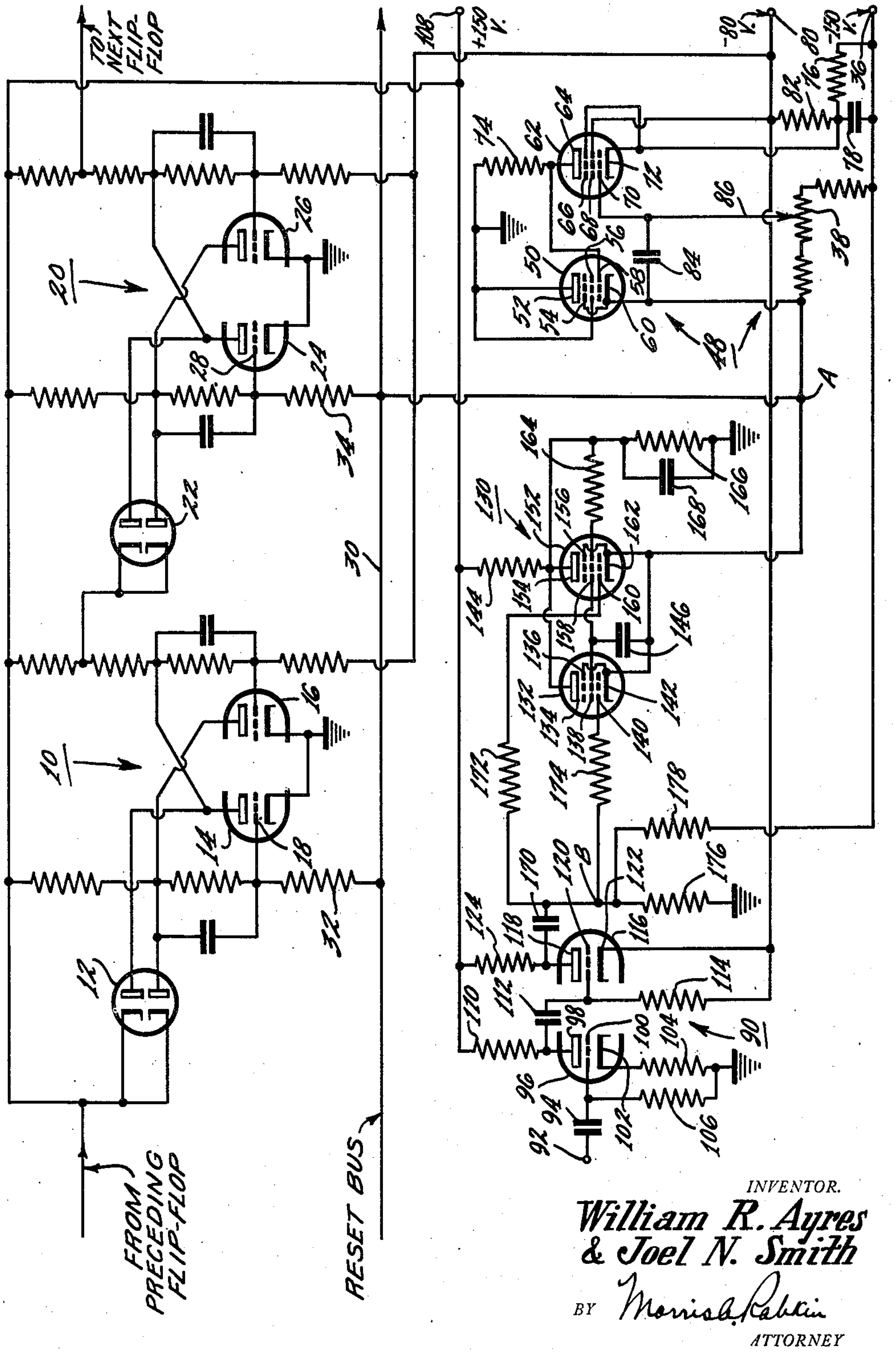
INVENTOR.
William R. Ayres
& Joel N. Smith
BY Morris A. Rabkin
ATTORNEY United States Patent Office 2,828,416
Patented Mar. 25, 1958

2,828,416

PULSE AMPLIFIER

William R. Ayres and Joel N. Smith, Camden, N. J., assignors to Radio Corporation of America, a corporation of Delaware Application October 22, 1953, Serial No. 387,763

9 Claims. (Cl. 250—27)

This invention relates to pulse amplifiers and more particularly to a pulse circuit especially valuable as a resetting circuit for one or more bistable multivibrators.

Pulse amplifying devices are widely employed in modern electronic systems for increasing or shaping pulse signals. The desired operation of such devices provides a sharp and precise amplification without residual or transient pulses and without the introduction of a high external impedance.

One particularly critical application of pulse amplifiers is in resetting a chain of bistable multivibrators in a high-speed computing machine. Bistable multivibrators, also termed flip-flops or trigger circuits, are well known in the art and are often used as a basic unit in binary counting operations.

These trigger circuits usually consist of two electron discharge devices, symmetrically interconnected such that when either conducts the other is cut off. The states of conduction may be switched by application of a proper signal pulse, so that by changing states a trigger circuit can effectively distinguish between odd and even numbers of pulses applied to it. When such trigger circuits are cascaded, and pulses to be counted are applied to the first circuit in the chain, the resulting combination of states of conduction is the binary representation of the number of pulses counted. Before counting, however, all the trigger circuits are usually placed in a starting condition by a reset pulse applied by some form of a pulse amplifying device.

Because counting operations must be repeated many times in a modern computer, reset must be as rapid as practical. Moreover, the reset operation should insure that all trigger circuits are reset to the desired condition, because reliability and accuracy are desired in computing operations. Reliable and rapid reset is difficult, however, particularly where a large number of triggers are to be reset. Some circuits employed in the prior art have the disadvantage of placing a high impedance in the common reset lead, thus increasing the difficulty of stable operation of the triggers. A high impedance problem also causes cross-talk or noise between the triggers during changes in operating states.

One circuit which has been employed for the purpose of overcoming these difficulties is shown in Patent No. 2,555,999, issued to R. J. Ringlee, on June 5, 1951, and entitled "Reset Circuit for Eccles-Jordan Triggered Multivibrator Circuits." Briefly, the circuit therein employed resets a chain of Eccles-Jordan multivibrator triggers by abruptly reducing the operating voltages of the discharge devices which are to be rendered non-conducting, and immediately thereafter abruptly returning these operating voltages to their normal level. This momentary reduction of the operating voltages of the device is produced by an electric pulsing circuit associated with a unidirectional voltage source connected to the particular discharge devices involved. The unidirectional voltage source includes a voltage regulating network, and the pulsing circuit operates with this voltage regulaing network to produce a rapid decay and return to normal operating voltage in response to a reset pulse. Such a structure is not readily employed, however, where operating requirements demand that reset be accomplished by application of a positive impulse to the control grids of all tubes which are to conduct.

Accordingly, it is an object of this invention to provide a pulse amplifier having improved characteristics and operation over pulse amplifiers previously known.

A further object of this invention is to provide an improved reset circuit for a chain of trigger circuits.

It is another object of this invention to provide a reset circuit presenting an impedance to the common reset lead of a chain of trigger circuits lower than that of previous re-set circuits.

A further object of this invention is to provide a pulse amplifier of greater reliability and greater speed of action than that of prior pulse amplifiers.

In accordance with one feature of the invention, a regulator tube in a voltage regulating circuit is connected as a cathode follower. A normally non-conducting second cathode follower is connected to have at least partially the same cathode load as the first cathode follower. When the normally non-conducting cathode follower is pulsed positively to conduct for a short time, the regulator tube is prevented from performing its normal stabilizing function for the pulse period being cut off by the pulse. At the pulse termination, the regulator tube rapidly resumes its previous operation in the regulatling circuit. The positive pulse, without appreciable ringing, may be taken from across this common cathode load.

In accordance with a further feature of this invention, reset for a chain of trigger circuits is accomplished by applying positive reset pulses to the control grid of each tube which is to conduct in the starting condition. A source of unidirectional potential is coupled to the common reset lead, and a regulator output tube coupled as a cathode follower is connected in this circuit. The potential available at the cathode of the cathode follower is the potential available at the reset lead. This reset potential is stabilized by a regulating network which includes the regulator output tube, a potentiometer, and a voltage tube. A normally non-conducting cathode follower means is also interposed in the circuit of the common reset lead. A positive reset pulse applied to this cathode follower means causes a rise in the potential of the common reset lead. This rise upsets the stability of the regulating network, since it amounts to a large negative load on the regulator output tube. Therefore, a sharp positive reset pulse appears on the common reset lead.

The novel features of the invention as well as the invention itself, both as to its organization and method of operation, will best be understood from the following description when read in connection with the accompanying drawing, the sole figure of which represents a circuit diagram of a preferred embodiment of the invention.

Two stages 10, 20 of a well-known binary type of counter are shown, each stage consisting of a bistable trigger circuit. A first trigger circuit 10 is connected to apply a pulse to a second trigger circuit 20 after the first circuit 10 has received two pulses applied to its input.

The starting condition of the counter is that in which the left hand tube 14, 24 in each trigger circuit 10, 20 is conducting. The triggers 10, 20 are driven by negative impulses from the system input or from the preceding trigger.

Because the design and operation of such trigger chains is well known, only a brief description will be given here. Two units of a chain are shown, these occupying the top half of the drawing. With all the left hand tubes 14, 24 conducting, a first negative pulse from a preceding trigger is directed through dual input coupling diodes 12 to the anodes of both sides 14, 16 of the first trigger 10. The pulse is also directed through resistor-condenser combinations to the grids of both sides. Since the left-hand tube 14 is already conducting, the negative pulse applied at its grid tends to reduce the space current and the anode voltage tends to rise. The same pulse applied to the grid of the right hand tube 16 has no effect since that tube is initially non-conducting. A regenerative effect then takes place. The increased anode voltage at the left hand tube 14 anode raises the grid voltage of the right hand tube 16, through the intermediate resistor-capacitor coupling. The potential of the anode of the right hand tube 16 is lowered, again lowering the potential of the grid of the left hand tube 14. This continues until the right hand tube 16 conducts and the left hand tube 14 is cut off, which is the other stable condition of the circuit.

The effect of a second negative pulse at the input is to reverse the states of conduction. A second pulse thus causes conduction to again take place in the left hand tube 14. Since the input to the second trigger 20 is taken off the anode of the left hand tube 14, conduction in that tube causes a negative pulse to be transmitted through input coupling diodes 22 to the second trigger 20, where the binary counting process is carried out in the same manner. The succeeding trigger 20, however, is responsive to only every second pulse, while the following triggers are respectively responsive to every fourth pulse, every eighth pulse, and so on.

A single reset bus or lead 30 is coupled through individual resistors 32, 34 to the grid 18, 28 of each left hand tube 14, 24 of the trigger circuits 10, 20.

A −150 volt unidirectional source 36 is in circuit with the common reset lead 30 through a voltage divider or potentiometer resistor 38. The reset lead assumes the potential of the point A in the drawing.

The voltage stabilizing device 48 which is employed in this embodiment utilizes two pentodes 50, 62. One pentode 50 is triode-connected as a regulator output tube having its anode 52 and screen grid 56 grounded, and its cathode 60 coupled directly to point A and to its suppressor grid 54. Thus, the regulator output tube 50 is coupled as a cathode follower. The other pentode 62 is a pentode amplifier connected as a voltage compensator tube. The anode 64 of the voltage compensator tube or pentode amplifier 62 is connected, through a resistor 74, to ground. The cathode 72 of the pentode amplifier 62 is connected to the suppressor grid 66, and, through a parallel connected resistor 76 and capacitor 78, to the −150 volt source 36. The screen grid 68 of the pentode amplifier 62 is coupled to a −80 volt source 80. The point at which the screen grid 68 is coupled to the −80 volt source 80 is also in circuit with the cathode 72 through a resistor 82.

The pentodes 50, 62 are interconnected directly from the plate 64 of the pentode amplifier 62 to the grid 58 of the regulator output tube 50, and from the grid 70 of the pentode amplifier 62 through a capacitor 84 to the cathode 60 of the regulator output tube 50. The pentode amplifier grid 70 is also connected to a movable arm 86 on the potentiometer 38.

An amplifier stage 90 is connected to a cathode follower stage 130 employing resistor 38. A reset input terminal 92 is coupled through a capacitor 94 to the grid 100 of a first inverter amplifier 96. The cathode 102 of this first inverter amplifier 96 is coupled to ground through a resistor 104, the grid 100 is shunted to ground by a resistor 106, and the anode 98 is coupled to a +150 volt source 108 by an anode load resistor 110. The plate 98 is also coupled, through a capacitor 112, to the grid 120 of a second inverter amplifier 116 and also through a resistor 114 to the −80 volt source 80. The anode 118 of the second inverter amplifier 116 is coupled to the +150 volt source 108 through an anode load resistor 124, and the cathode 122 is coupled to the −80 volt source 80.

The cathode follower stage 130 consists of a pair of paralleled pentodes 132, 152 whose cathodes 142, 162 are coupled to point A, and whose anodes 134, 154 are coupled through a common anode load resistor 144 to the +150 volt source 108. The suppressor grids 136, 156 of each of the paralleled pentodes 132, 152 are coupled to the cathodes 142, 162. The screen grids 138, 158 are coupled together, and, additionally, through a capacitor 146 to the common cathode connection, and through a resistor 164 and a resistor-capacitor shunt combination 166, 168 to ground. These paralleled pentodes 132, 152 are connected to receive signals from the second inverter amplifier 116 by parallel connections from the inverter amplifier anode 118, through a common capacitor 170 and thence through individual resistors 172, 174 to the control grids 140, 160 of each of the pentodes 132, 152. The junction B between the capacitor 170 and the two resistors 172, 174 is connected through a resistor 176 to ground and through an additional resistor 178 to the −150 volt source 36.

The paralleled cathode followers 132, 152 are normally held cut off by the voltage at junction B.

In operation, the voltage of point A is stabilized by the tendency of the cathode potential of the regulator output tube 50 to change in the opposite direction to changes in voltage across the voltage divider 38. Thus, when the voltage across the voltage divider 38 tends to increase, the voltage at the grid 70 of the pentode amplifier 62 also tends to increase. The pentode amplifier 62 consequently conducts more heavily, lowering the amplifier plate 64 potential and the potential of the grid 58 of the regulator output tube 50. The lowered cathode voltage 60 of the regulator output tube 50 then counteracts the tendency of the voltage across the voltage divider 38 to increase. The potential at point A is therefore stabilized.

A positive pulse applied at the reset input 92 is passed by the capacitor 94 coupled to the grid 100 of the first inverter amplifier 96. This pulse lowers the voltage of the anode 98 of the first inverter amplifier 96 and the coupled grid 120 of the second inverter amplifier tube 116, so that the anode 118 potential of the second inverter amplifier 116 rises, causing the potential of the grids 140, 160 of the paralleled cathode followers 132, 152 to rise in response. The paralleled cathode followers 132, 152 are normally held cut off by the voltage through the resistor 178 at junction B coupling their common grid lead to the −150 volt source 36. The cathode follower cathodes 142, 162 follow the voltage on their grids 140, 160, thus acting to raise the potential of point A during the period of the input pulse.

This increased potential at point A raises the potential of the cathode 60 of the regulator output tube 50 sufficiently to cut off the regulator output tube 50. The cathode 60 of regulator output tube 50 cannot be lowered in potential after cut off of the output tube 50, because to do so the latter would have to conduct in the reverse direction. From one viewpoint, the positive pulse at point A can be considered as an excessive negative load on the regulator output tube 50, and the voltage regulating device 48 cannot counteract the positive pulse. The positive pulse at point or junction A resets the trigger stages 10, 20 in the manner described above. On termination of the positive pulse the regulator output tube 50 again conducts. The regulator output tube 50 immediately thereafter resumes its stabilizing action with respect to the potential of the reset lead 30, counteracting variations due to the potential source or the trigger stages.

A large chain of triggers may be reset with the pulse amplifying arrangement disclosed. The use of a regulated voltage supply to the common reset lead minimizes the impedance due to the reset circuit and, therefore, minimizes the disturbance to trigger operation. Since reset pulses are applied to the grids, there is no large plate current demand when a considerable number of triggers are used in the chain. Also, with positive signals, a cathode follower driving means can rapidly follow a changing grid potential, and thus provide a sharper action. This includes an immediate return to a stabilized potential and the minimization of ringing. Finally, the application of reset pulses to only one grid of a trigger means that there is less danger of residual pulses existing in the trigger circuit after reset has been accomplished. It is to be understood that the general description of this arrangement as a pulse amplifier is not to connote that the cathode followers employed can have a gain greater than unity.

Thus, there has been described a novel pulse amplifying circuit having special advantages in reset circuits for a chain of trigger circuits. A selected potential is maintained constant by a voltage stabilizing network which is so arranged that a positive signal pulse temporarily disables the stabilization and provides output impulses, as for resetting triggers to a starting condition.

What is claimed is:

1. A pulse circuit comprising means to connect to a voltage source, a regulator cathode follower amplifier having a cathode resistor, a compensating amplifier connected to said means and to said regulator amplifier in a sense to cause compensation for fluctuations in the voltage across said resistor, a second cathode follower amplifier having as its cathode resistor said first-mentioned resistor, means to maintain said second cathode follower normally nonconductive, means to make said second cathode follower conductive for a pulse period, whereby said regulator cathode follower loses stabilizing control of the voltage across said resistor for the duration of the pulse of said pulse period and regains stabilizing control on termination of the pulse.

2. A pulse circuit comprising means to connect to a voltage source, a regulator electron discharge tube coupled as a cathode follower amplifier, said regulator tube having a cathode resistor, a compensating amplifier electron discharge tube connected to said means and to said regulator tube in a sense to cause compensation for fluctuations in the voltage across said resistor, thereby to stabilize the voltage across said cathode resistor, electron discharge tube means coupled as a second cathode follower amplifier and having as its cathode resistor said first mentioned resistor, means to maintain said electron discharge tube means normally non-conductive, and means to make said electron discharge tube means conductive for a pulse period, whereby said regulator tube loses stabilizing control of the voltage across said cathode resistor for the duration of the pulse of said pulse period and regains stabilizing control on termination of the pulse.

3. A pulse circuit comprising a unidirectional voltage source, a regulator cathode follower pentode having a cathode resistor, a compensating pentode amplifier connected to said voltage source and to said regulator pentode in a sense to vary the regulator pentode current in a sense opposite to fluctuations in said voltage source, thereby to stabilize the voltage across said cathode resistor, a pair of paralleled cathode follower pentodes having said cathode resistor in common with said regulator pentode, means to maintain said paralleled cathode follower pentodes normally non-conductive, and electron discharge tube means to make said paralleled cathode follower pentodes conductive for a pulse period, whereby said regulator pentode loses stabilizing control of the voltage across said cathode resistor for the duration of the pulse of said pulse period and regains stabilizing control on termination of the pulse.

4. A reset circuit for a trigger circuit of the type wherein a pair of electron discharge tubes have alternate stable states of conduction, one of which states is a starting state, and wherein each electron discharge tube has at least an anode, cathode, and control electrode, said reset circuit comprising means for coupling a source of unidirectional potential to the control electrode of the one tube of said pair of electrod discharge tubes which conducts in the starting state, a regulating electron discharge device coupled as a cathode follower and having an output, said output being coupled in the circuit of said source of unidirectional potential and said control electrode, means for maintaining a constant regulated output from said regulating electron discharge device, normally non-conducting control cathode follower means coupled in the circuit of said source of unidirectional potential and said control electrode, and means for positively pulsing said control cathode follower means to provide a positive reset pulse at the control electrode of the electrode discharge tube which conducts in the starting state, irrespective of said constant regulated output.

5. A circuit for resetting a bistable multivibrator of the type wherein a pair of electron discharge devices are interconnected to maintain alternately conducting stable states in response to signal pulses, and wherein a desired starting state of conduction is attained by application of a positive resetting impulse to a grid electrode of one of said electron discharge devices, said reset circuit comprising means for coupling a source of unidirectional potential to said resetting grid electrode, a regulating cathode follower tube having an anode, cathode and at least one control electrode, said cathode coupled in the circuit of said unidirectional potential source and said resetting grid electrode, voltage compensating means connected in the control electrode to cathode circuit of said cathode follower tube to maintain a constant regulated output from said cathode of said cathode follower, a number of paralleled cathode follower tubes having their outputs coupled in the circuit of said unidirectional potential source and said resetting grid electrode, said paralleled cathode follower tubes being normally non-conducting, and means for applying a positive reset signal to said paralleled cathode follower tubes to render said paralleled tubes conducting and thereby apply a positive reset signal to said resetting grid electrode.

6. A circuit for resetting a chain of trigger circuits, each of said trigger circuits having two stable conducting conditions one of which is a starting condition, and each having an electron discharge device including a grid electrode to which a positive voltage pulse is applied to reset said trigger circuit to its starting condition, said reset circuit comprising means for coupling a source of unidirectional potential to said resetting grid electrodes, regulating cathode follower means having its output coupled in the circuit of said unidirectional potential source and said resetting grid electrodes, means for maintaining a constant regulated output from said regulating cathode follower means, normally non-conducting control cathode follower means having its output coupled in the circuit of said unidirectional potential source and said resetting grid electrodes, and means for positively pulsing said control cathode follower means to provide a positive reset pulse at said resetting grid electrodes.

7. A circuit for resetting a chain of trigger circuits, each of said trigger circuits having two stable conducting conditions, one of which is a starting condition, and each having an electron discharge device including a grid electrode to which a positive voltage pulse is applied to reset said trigger circuit to its starting condition, said reset circuit comprising means for coupling a source of unidirectional potential to said grid electrodes, a regulator output tube having an anode, cathode, and at least one control electrode, a cathode resistor in the circuit of said unidirectional potential source and said grid electrodes, said regulator output tube being connected as a cathode follower to said cathode resistor, a voltage compensating tube connected in the control electrode to cathode circuit of said regulator output tube in a sense to cause compensation for fluctuations in said unidirectional potential source thereby to stabilize the voltage across said cathode resistor, a pair of paralleled cathode follower tubes having said cathode resistor in common with said regulator output tube, means to maintain said paralleled cathode follower tubes normally non-conductive, and electron discharge tube means to make said paralleled cathode follower tubes conductive for a pulse period, whereby said regulator output tube loses stabilizing control of the voltage across said cathode resistor for the duration of said pulse, and said positive reset pulse is applied to said resetting grid electrode.

8. A pulse circuit comprising means to connect to a voltage source, a regulator cathode follower amplifier, a resistor in the cathode circuit of said amplifier and coupled to said means, a compensating amplifier coupled to said means and to said regulator amplifier in a sense to stabilize the voltage across said resistor, a second cathode follower amplifier having an input and having an output connected to the cathode circuit of said regulator amplifier, means coupling said input to maintain said second cathode follower normally non-conductive, means for coupling said input to a pulse source to make said second cathode follower conductive for a pulse period, whereby said regulator cathode follower loses stabilizing control of the voltage across said resistor for the duration of a pulse and regains stabilizing control on termination of the pulse.

9. A circuit for resetting a chain of trigger circuits, each of said trigger circuits having two stable conditions one of which is a starting condition, and each having an electron discharge device including a grid electrode to which a positive voltage pulse is applied to reset said trigger circuit to its said starting condition, said reset circuit comprising means for coupling a source of unidirectional potential to said grid electrodes, a regulating cathode follower device having its output coupled to said means, a voltage regulating device for maintaining a constant voltage regulation at the output of said cathode follower device, a normally non-conducting control cathode follower having a cathode coupled to said means, and means for positively pulsing said control cathode follower to provide a positive reset pulse at said resetting grid electrodes.

References Cited in the file of this patent

UNITED STATES PATENTS

| | | |
|---|---|---|
| 2,435,331 | Street | Feb. 3, 1948 |
| 2,441,880 | Goodale et al. | May 18, 1948 |
| 2,485,665 | Shepherd | Oct. 25, 1949 |
| 2,521,774 | Bliss | Sept. 12, 1950 |
| 2,555,999 | Ringlee | June 5, 1951 |
| 2,562,476 | Rado | July 31, 1951 |
| 2,662,938 | Goldstine | Dec. 15, 1953 |
| 2,689,952 | Johnson et al. | Sept. 21, 1954 |